Sheet 1-2 Sheets
P. H. Roots,
Rotary Blower,
No. 2,369. Reissued Oct. 2 1866.
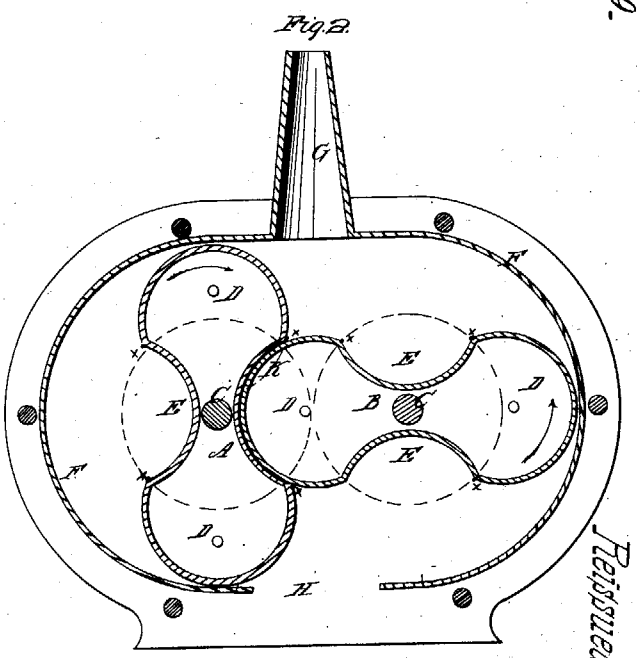
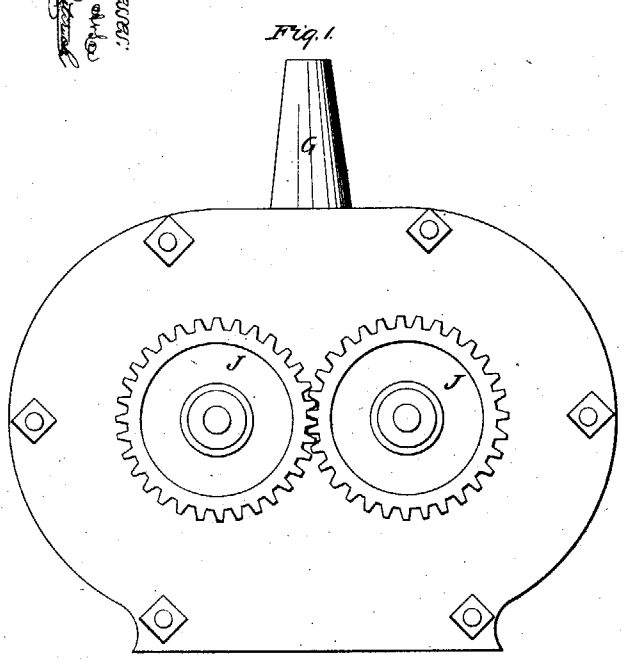
Witnesses:
Goodwin St. Clair
G. F. Whitcomb
Inventor:
P. H. Roots
by Munn & Co
Attorneys Sheet 2-2 Sheets.

P. H. Roots,

Rotary Blower,

No. 2,369. Reissued Oct. 2, 1866.

Witnesses:
Chas. D. Smith
Geo. H. Rothwell.

Inventor:
P. H. Roots
By Munn & Co
Attys.

UNITED STATES PATENT OFFICE.

P. H. ROOTS, OF CONNERSVILLE, INDIANA.

IMPROVEMENT IN BLOWERS.

Specification forming part of Letters Patent No. 30,157, dated September 25, 1860; Reissue No. 2,369, dated October 2, 1866.

*To all whom it may concern:*

Be it known that I, P. H. ROOTS, of Connersville, in the county of Fayette and State of Indiana, have invented a new and useful Improvement in Rotary Blowers; and I do hereby declare that the following is a full, clear, and exact description of the same, sufficient to enable any one skilled in the art to which my invention appertains to make and use the same, reference being had to the accompanying drawings, forming a part of this specification, in which—

Figure 4:
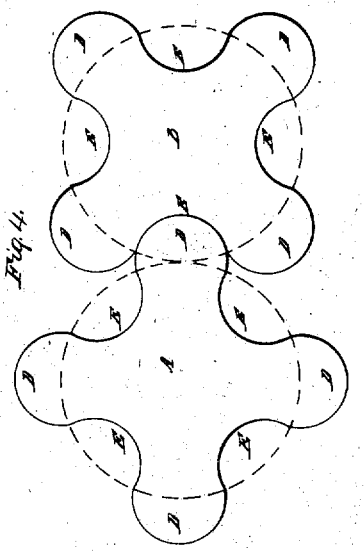
Figure 5:
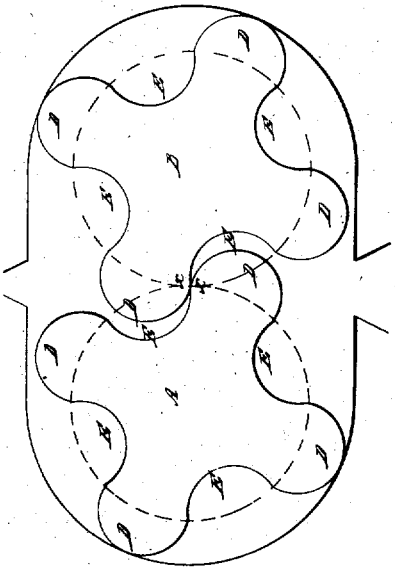
Figure 3:
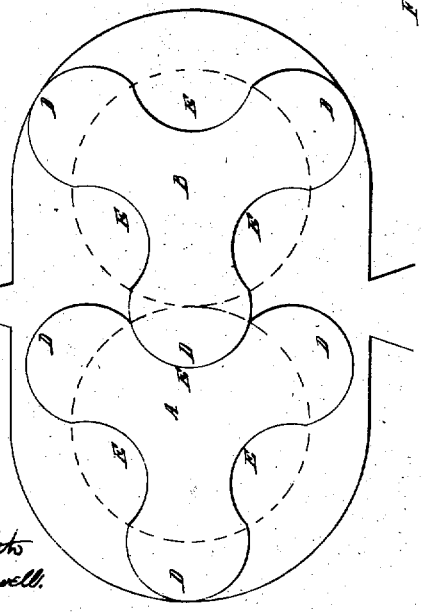

Figure 1 represents a side view, and Fig. 2 a central vertical section. Figs. 3, 4, and 5 are diagrams illustrating the construction and operation of the apparatus, with three or four pistons and a corresponding number of recesses on each abutment.

Similar letters of reference in each of the several figures indicate corresponding parts.

The subject of my invention is a rotary-blower pump or engine consisting of coacting rotary abutments, each provided with two or more pistons and a corresponding number of recesses, which pistons and recesses constitute, respectively, convex and concave arcs of equal radius, as will be hereinafter described.

To illustrate my invention, I will first describe it as represented in Figs. 1 and 2, where each rotary abutment consists of two pistons, which form arcs of circles, and each inclose one-quarter the circumference of a given circle, and of two recesses, which form arcs of equal radius with the pistons, and also occupy each one-quarter of the circumference of the said given circle. By this combination of pistons and recesses, constructed as described, but four small essential points of contact during the revolution of the pistons are experienced, and therefore at these points narrow packing-strips can availably be employed for rendering the pistons air-tight during the time that the vacuum is being formed, and these come into play periodically and successively, or at the moment when one ceases its contact another supplies its place.

It is a very essential thing to have the points of positive contact located, for the machine when first made, if employed as a rotary pump, can be run for some time without packing, and when the parts have worn so as not to be sufficiently tight the points of contact can be restored and the machine rendered air-tight, as when first used, and thus the loss and expense attending the construction of new pistons or the bringing of the parts closer together obviated. In this particular my machine differs from all others that I am familiar with, and especially from David M. Walker's pump, patented in 1835, whereas, with the combination of pistons and recesses constructed as Mr. David M. Walker describes in the patent granted to him in 1835 on a hydrant-pump the points of contact are continually changing while the piston is making its movement through the curved recess, and therefore it is impossible to availably employ strips of packing at any certain points; and this being so, his machine certainly could not be used effectively as a blower, it being essentially important, in order to have a machine of this character operate effectively for the blowing of air, to pack the pistons air-tight, for if they are not packed air-tight the effective action of the air will be lost to a great degree by reason of its escape between the abutments.

In Figs. 1 and 2, A and B represent two double-acting rotating abutments, made alike in all respects. C C are their shafts. D D D D are pistons, which are all alike. E E E E are the recesses which receive the pistons, and are all alike. F F is a concave or case extending around so as just to clear the pistons as they revolve. H and G are the induction and discharge openings, both of which may be made of a size adapted to the uses to which the machine is to be applied.

The pistons D D D D and recesses E E E E are arcs of circles, and have one common radius, which radius is the chord of an arc of one-eighth the circumference of the circle on which they are formed. (Shown by the dotted circle in Fig. 2.)

The abutments A and B are made to revolve simultaneously by means of two equal cog-wheels, J J, upon the shafts C C of the abutments, as seen in Fig. 1.

In order to have the parts operate very tightly, as in the case of a blower, suitable metallic or other packing is to be inserted in the piston at the points X X, said points being the only ones of positive contact which are experienced during the revolution of the abutments. When very dense fluids are operated it will be desirable to remove so much of each of the pistons, as represented in red at K, as will allow the free escape of the fluids as the pistons enter the recesses. The same arrangement will be useful for high velocities, when the fluids are not very dense; for when a dense fluid is suddenly forced out of the recess a concussion is the result, similar to striking upon a solid substance, whereas, by allowing a sufficient outlet, all such concussion is avoided, and the fluid escapes at such reduced velocity through the enlarged opening that the operation is easy.

If, as a blower, a machine of operating size is run at a velocity of three hundred or four hundred revolutions per minute, a distinct sound can be heard as the air is forced from the recesses in a blower; it will, therefore, be useful, as considerable motive power would be saved thereby.

Figs. 3 and 4 illustrate the mode of forming the abutments with more than two pistons and two recesses each. If, instead of taking the chord of an eighth part of the circle as the radius, as shown in Figs. 1 and 2, the chord of the twelfth part be taken as the radius with which to describe the arcs of the pistons and recesses, an abutment with three pistons and three recesses will be produced, as illustrated in Fig. 3, the centers for describing both being, as before, in the circumference of the circles. Again, if the chord of one-sixteenth part of the circle be taken as the radius for describing the pistons and recesses, their centers being, as before, in the peripheries of the circles, then abutments are formed, each having four pistons and four recesses, as shown in Figs. 4 and 5. The principle of the pistons entering and passing the recesses is the same in all these cases.

Fig. 5 illustrates, at *x x*, the passing of the points of positive contact, at which points the packing may be applied, as before explained. In Figs. 1 and 2 there are four such points of contact; in Fig. 3, six, and, in Figs. 4 and 5, eight.

The operation is as follows: When the pistons are made to revolve in the direction of the arrows the air or water, or whatever fluid is acted upon, will be carried forward as the pistons approach together, and is forced through the discharge-pipe G; and, as the pistons fill the recesses, there can be no backward escapement. In this manner the device will act as a blower or pump.

It is evident that by reversing the operation and acting upon the pistons by steam or water the device becomes a rotary steam-engine or a pressure-water-wheel.

As the peripheries of all the internal parts are in perfect circles, either convex or concave, it will be comparatively easy to construct them with accuracy.

Having thus described my invention, what I claim as new, and desire to secure by Letters Patent, is—

The coacting rotary abutments A B, each consisting of two or more pistons, D D, and two or more recesses, E E, which are arcs of true circles and formed with equal radii, substantially as set forth.

To the above specification of my improved blower I have signed my hand this 12th day of September, 1866.

P. H. ROOTS.

Witnesses:

GEO. W. ROTHWELL,

JAS. L. EWIN.